United States Patent [19]
Barth et al.

[11] 3,869,479
[45] Mar. 4, 1975

[54] REMOVAL OF IMPURITIES DURING THE RECOVERY OF CRUDE PHTHALIC ANHYDRIDE

[75] Inventors: Hans Dieter Barth, Gruner; Erich Brand, Maarweg, both of Germany

[73] Assignee: Chemiebau,Dr. A. Zieren GmbH & Co., K.G., Cologne-Braunsfeld, Germany

[22] Filed: Feb. 8, 1971

[21] Appl. No.: 113,278

[30] Foreign Application Priority Data
Feb. 7, 1970 Germany............................ 2005628

[52] U.S. Cl.............. 260/346.4, 260/346.7, 165/61, 134/5, 134/30
[51] Int. Cl............................................ C07c 63/18
[58] Field of Search...................... 260/346.7, 346.4

[56] References Cited
UNITED STATES PATENTS
2,441,873  5/1948  Downs............................ 260/346.4
2,676,180  4/1954  Frank............................... 260/346.7
3,024,251  3/1962  Feder et al....................... 260/346.8

Primary Examiner—Henry R. Jiles
Assistant Examiner—Bernard I. Dentz
Attorney, Agent, or Firm—Millen, Raptes & White

[57]  ABSTRACT

In separators for recovering crude phthalic anhydride from reaction gases containing same, wherein the phthalic anhydride is first precipitated on heat exchange tubes supplied with cooled fluid and then melted from the same tubes which are then supplied with heated fluid, at least a portion of the tubes are flushed during the melting period with externally added molten phthalic anhydride. This flushing procedure serves to dissolve the difficult-to-melt, firmly adhering deposits of impurities which otherwise would form a buildup to the point of necessitating the shutting down and cleaning of the separator.

12 Claims, 2 Drawing Figures

3,869,479

REMOVAL OF IMPURITIES DURING THE RECOVERY OF CRUDE PHTHALIC ANHYDRIDE

BACKGROUND OF THE INVENTION

This invention relates to an improved process and apparatus for the recovery of phthalic anhydride from gases containing same, and in particular to such processes wherein the phthalic anhydride is precipitated on a cold heat transfer surface, and then melted off by having said surface sufficiently warmed.

The preparation of phthalic anhydride is conventionally conducted by the gas phase oxidation of o-xylene or naphthalene with air in contact with $V_2O_5$ catalysts. The phthalic anhydride is then precipitated from the reaction gases in separators, these separators being provided with heat transfer surface, usually tubes, which can be periodically cooled and heated, respectively, for the deposition and the removal, by melting, of the thus-precipitated phthalic anhydride. These separators conventionally contain many rows of tubes which are surrounded by the flowing reaction gases during the precipitation phase. In the continuous operation of these separators, it has been found that firmly adhering, high melting impurities gradually cover the pipes. These deposits, in contrast to the phthalic anhydride, cannot be removed by melting at conventional heating medium temperatures. Thus, in due time, these hard-melting deposits build up to the point where the operation must be interrupted so that fouled heat exchange tubes can be cleaned. Such interruptions are undesirable, of course, since, on the one hand, a standby separator must be kept on hand, and the cleansing of the separator is laborious.

The place in the separator where the deposits of impurities first adhere is dependent, to a large degree, on the nature of the aromatic starting material. Thus, impurities are either deposited first on the tubes disposed on the gas inlet side of the separator or on the tubes on the gas outlet side of the separator.

SUMMARY OF THE INVENTION

Bearing in mind the above-stated fouling problem, the principal object of this invention is to provide a process and apparatus for the separation of phthalic anhydride from gases containing the same while decreasing the frequency of or eliminating the occurrences of the above-mentioned operational disturbances due to the formation of firmly adhering, high melting deposits on heat exchange tubes.

Upon further study of the specification and appended claims, other objects and advantages of the present invention will become apparent.

To attain the above objects, there is provided an improved process wherein the heat transfer surface is flushed with externally added crude molten phthalic anhydride during a period when the precipitated phthalic anhydride is being melted from said surface. It was unexpectedly discovered that this step can maintain the heat exchange tubes free or substantially free of gradually accumulating, firmly adhering, difficult-to-melt deposits of impurities. This is especially surprising since the tubes are conventionally in contact with the molten phthalic anhydride during the melting period. It is only by introducing additional molten phthalic anhydride supplied from the outside, during the melting-off phase, that undesired deposits are dissolved and flushed away.

BRIEF DESCRIPTION OF DRAWING

In the attached drawing.

DETAILED DISCUSSION OF THE INVENTION

Figure 1:
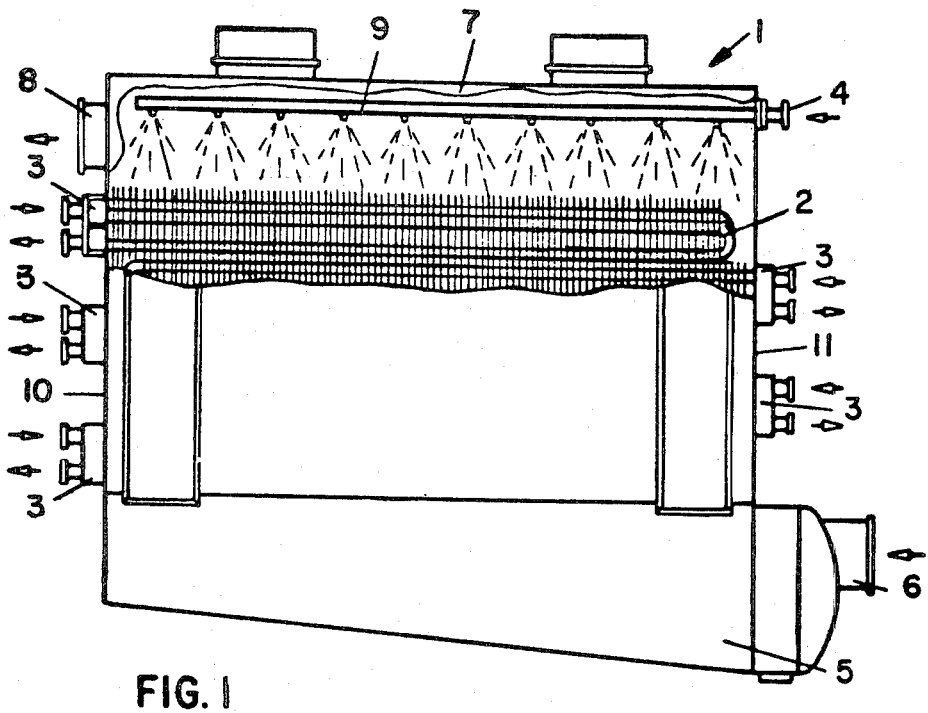
FIG. 1 is a side view partially broken away, of a preferred embodiment of the apparatus of this invention.
Figure 2:
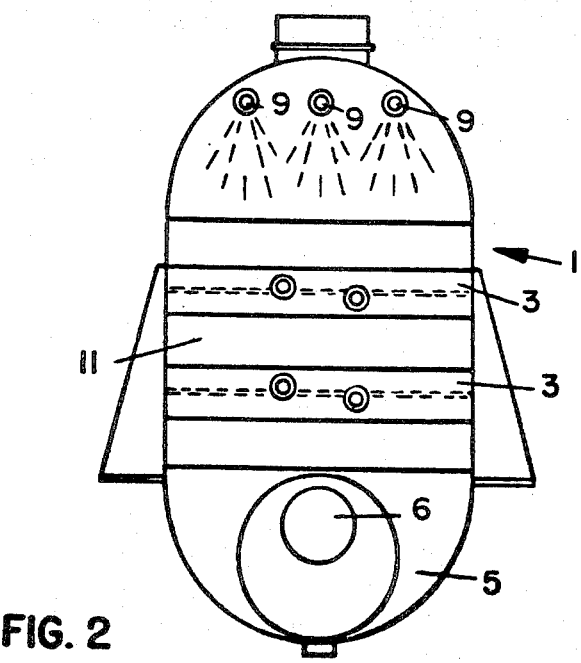
FIG. 2 is a front view thereof.

Preferably, the heat exchange tubes subject to fouling are flushed with molten crude phthalic anhydride having a temperature of 130°–280°C., especially 130°–175°C. The crude phthalic anhydride discharged from the separators is available at this temperature, so that no additional thermal energy is required, it being only necessary to periodically recycle a fraction of the discharged crude.

It is also preferred that the tubes are exposed to the externally introduced molten crude phthalic anhydride towards the end of the melting-off period, e.g. the last 0.5 percent of the period. Whereas, at the beginning of the melting-off phase, the melting phthalic anhydride runs over the tubes and exhibits a partial dissolving power, this effect becomes less towards the end of the melting-off period, especially in the case of those tubes disposed in the upper section of the separator. Consequently, it is necessary, particularly towards the end of the melting-off time, to flush the upper tubes to the externally added phthalic anhydride melt.

According to another feature of this invention, provision is made in the separation of a phthalic anhydride formed by o-xylene oxidation for the tubes disposed proximate the gas outlet side of the separator to be subjected to flushing by the added phthalic anhydride melt. The reason for this is that during the oxidation of o-xylene with air, a reaction gas is formed which contains, in addition to phthalic anhydride, also maleic anhydride, water, and other impurities. Maleic anhydride and water, in particular, compounds readily volatile as compared to phthalic anhydride, are condensed in the coldest part of the separator on the tubes proximate the gas outlet side. In this case, it is sufficient to flush these upper tubes alone with the added molten phthalic anhydride, thereby preventing the maleic acid from being converted to hard-to-melt fumaric acid.

The reaction gas obtained by the naphthalene oxidation, however, contains, in addition to other inpurities, minor amounts of substances having a higher boiling point than phthalic anhydride, which substances are the first to be precipitated during the separating process, i.e. on the tubes proximate the gas inlet side of the separator. Accordingly, it is essential to flush these tubes with externally supplied molten phthalic anhydride, to prevent these likewise difficult-to-melt substances from forming a buildup on the tubes.

The treatment with added crude phthalic anhydride according to this invention may not be required in each melting-off cycle. Depending on the content of the critical impurities in the reaction gas, the treatment with the added phthalic anhydride melt according to this invention can be conducted after several, e.g. 20 to 300 melting-off periods while still preventing a buildup of impurities. However, the time intervals and the quantity of impurities removed by dissolution according to this invention should preferably not be so large that the charge laden with these impurities cannot be rectified to the required degree of purity by means of an existing rectification unit. Therefore, it is generally advantageous to utilize a relatively frequent removal of the difficult-to-melt deposits, e.g. once every 20 to 50 cycles. In this way a crude phthalic anhydride is obtained which does not exhibit too great a variation in the concentration of the thus-removed impurities during the course of the production.

The temperature of the reaction gas is, upon entrance into the separator, 145°–200°C, preferably 165°–175°C. The gas temperature, upon exit from the separator, is 55°–65°C. The concentration of the reaction gas in phthalic anhydride at the beginning of the separation is about 37–42 g./Nm³. The temperatures of the cooling and/or heating means are 45°–55°C. and 145°–190°C., respectively.

Preferred apparatus for conducting the process comprises a housing with rows of tube bundles disposed therein, which tube bundles are surrounded by the flow of the phthalic anhydride-containing gases. These tubes can be used either for heating or cooling means. The housing is further provided with openings for the feeding and discharging of the gases and for draining the melted-off phthalic anhydride. This apparatus also comprises means to flush the heat exchange surface with externally added crude molten phthalic anhydride. For this purpose, it is preferred to provide at least one distributing pipe arranged in the housing close to a portion of the tube bundles, which distributing pipe is in communication with a container for crude phthalic anhydride. Crude phthalic anhydride is fed to this distributing pipe by means of a pump, for example, from the collecting tank receiving the melted-off phthalic anhydride from the separators. The distributing pipes are suitably provided with outlet openings or nozzles directed toward the pipes to be treated with the phthalic anhydride. The distributing pipes make it possible to direct vigorous streams of liquid phthalic anhydride onto the respective pipes during the melting-off period, and thereby to flush and effect the dissolution of difficultly meltable deposits.

In a separator for phthalic anhydride formed by o-xylene oxidation, the distributor pipes are provided in the housing proximate the tube bundles arranged near the gas outlet side. The maleic anhydride and water contained in the reaction gas are partially deposited on the tubes disposed proximate the gas outlet side where the reaction gas is cooled to its lowest point. Unless purged from the separator, the maleic acid would be rearranged into difficultly meltable fumaric acid under the influence of the elevated temperature during the melting step. To avoid the accumulation of such fumaric acid layers, these tubes proximate the gas outlet are treated with crude, molten phthalic anhydride from the distributing pipes, so that a sufficient amount of phthalic anhydride runs over the heat exchange tubes during the melting-off phase. The same holds true in case of separators for phthalic anhydride formed by the oxidation of naphthalene, but in this instance the distributing pipes for the phthalic anhydride are disposed in the housing proximate the tube bundles positioned near the inlet side of the gas.

In any case, it is quite evident that the process of this invention can be conducted in separators having a wide variety of configurations. The only essential point is the apparatus must comprise means to expose and flush the heat exchange surfaces endangered by the formation of difficultly meltable deposits to and with externally added molten, crude phthalic anhydride. By "externally added" it is intended to include molten phthalic anhydride recycled within the separator, for example, by a pump disposed within the separator housing and adjacent the conduit used for discharging the melted-off phthalic anhydride, and the outlet of the pump is connected to a distributor pipe.

As for details of a separator, it can consist, for example, of a cylindrical, externally heatable housing having a detachable housing head carrying the tube bundles and the distributing pipe. In the cylindrical housing, the tube bundles are arranged in a concentrically circular fashion and the distributing pipe is disposed axially. The hot reaction gas containing phthalic anhydride obtained by the oxidation of o-xylene flows from the cylindrical housing wall through the rows of tube bundles substantially radially toward the inside and is discharged, for example, through an axial nipple in the housing head. The tubes of the innermost tube ring which are especially endangered in this case by the formation of difficulty meltable deposits can be scrubbed by the distributing pipe by means of radially outwardly oriented jets of molten phthalic anhydride. In the precipitation of phthalic anhydride formed by the oxidation of naphthalene, the gas direction can be reversed, so that the difficultly meltable deposits are likewise formed on the tubes of the inner ring. Of course, it is also possible to direct the gas flow from the outside toward the inside; however, in such a case, the tubes of the external ring must be scrubbed with the phthalic anhydride melt in order to avoid deposits.

The process of this invention can also be employed in phthalic anhydride separators now in use in many installations. These separators consist of a closed housing having a rectangular cross section with horizontally arranged heat exchange elements composed of ribbed tubes and having connections for effecting the cyclical use of a cooling medium and a heating medium. The reaction gas flows upwardly at right angles to the ribbed tubes, the phthalic anhydride being precipitated on the tubes during the cooling phase. For effecting the scrubbing of this invention conducted on the endangered heat exchange tubes, several distributing pipes are provided above the uppermost pipes and in parallel to the latter. With the aid of a pump, molten crude phthalic anhydride is fed to these distributing pipes from a collecting tank. These distributing pipes are provided with nozzles on the underside thereof, through which vigorous jets of molten phthalic anhydride are directed onto the tube bundles disposed on the inlet side or on the outlet side.

When conducting the separation of phthalic anhydride formed by the oxidation of o-xylene, the fumaric acid deposits forming on the tubes arranged on the outlet side are dissolved by the scrubbing step with phthalic anhydride. Moreover, it is also possible to remove deposits on the ribbed tubes disposed on the inlet side which are more difficult to remove, as they are formed in case of a phthalic anhydride obtained by naphthalene oxidation, so long as provision is made to flush, scrub, submerge or the like, these tubes with externally added molten phthalic anhydride.

DETAILED DESCRIPTION OF THE DRAWING

According to the figures, ribbed tubes 2 bent in a hairpin shape are accommodated in a housing 1; these tubes are connected, at the end faces 11, 10 of the housing 1, to common distributing and collecting chambers 3. The ribbed tubes 2 are disposed, with their collecting and distributing chambers 3, alternately toward different sides, wherein the collecting chamber of one tube bundle is in communication with the distributing chamber of the next-lower or next-higher tube bundle by means of tubes disposed outside of the separator housing, so that the tube bundles have a successive stream of cooling medium or heating medium flowing there-through. A trough or sump 5 provided with an inlet conduit 6 for the reaction gas is arranged underneath the heat exchange tubes. Above the heat exchange tubes the housing is closed off by a hood 7 provided with the gas outlet conduit 8. In the hood 7, several distributing pipes 9 are disposed in parallel to the tube bundles 2. The distributing pipes 9 are provided with nozzles on their undersides and can be connected, via the connecting pipe 4, to the pressure side of a pump (not shown) in communication with a source of crude phthalic anhydride. The distributing pipes 9 make it possible to flush the uppermost ribbed pipe and bundles 2 which, in contrast to the lower ribbed pipe bundles, have little contact with molten phthalic anhydride during the melting-off period, and thus to prevent the accumulation of difficultly meltable deposits on these tube bundles. If the separator is to be used in the recovery of phthalic anhydride produced by naphthalene oxidation, the distributing pipes 9 are placed above the tube bundles proximate the gas inlet 6 so that the tube bundles can be flushed to remove the high boiling difficult-to-melt impurities.

Without further elaboration, it is believed that one skilled in the art can, using the preceding description, utilize the present invention to its fulles extent. The following preferred specific embodiments are, therefore, to be construed as merely illustrative, and not limitative of the remainder of the disclosure in any way whatsoever.

EXAMPLE

The separator has an internal cooling and heating surface of 1500 m². During a time of 400 minutes the tubes of the separator are cooled to 55°C whereby phthalic anhydride contained in the gas is condensed on the tubes. Thereafter the cooling medium is switched off and the tubes are heated by means of hot oil of 190°C. After a heating time of 25 minutes substantially all of the phthalic anhydride is melted and removed from the tubes. In order to remove deposits the tubes are flushed with 4 m³ of 170°C hot phthalic anhydride melt during a time of 5 minutes, i.e. the tubes are rinsed with 2.67 l melt per m² tube surface. After this flushing period the separator is cooled back to 55°C in about 45 minutes and the cycle begins again. The flushing is provided in each cycle.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a cyclical process for recovering solid phthalic anhydride in a separator from a gas containing phthalic anhydride vapor obtained by catalytic air oxidation of o-xylene in contact with a $V_2O_5$ containing catalyst, comprising continuously repeating in sequence the steps of: (a) passing said gas containing phthalic anhydride vapor over cooled heat exchange tubes to precipitate solid phthalic anhydride on the surfaces thereof; (b) passing a hot fluid having a temperature of about 145°–190°C through said heat exchange tubes to heat the surfaces thereof to at least 130°C and melt off resultant precipitated phthalic anhydride; (c) collecting resultant molten phthalic anhydride from said heat exchange tube surfaces; and (d) cooling said heat exchange tube surfaces by passing a fluid having a temperature of about 45°–55°C therethrough:

the improvement comprising flushing said heat exchange tube surfaces at the heat transfer surfaces thereof proximate to the gas outlet side of said separator towards the end of at least one step (b) with externally added molten phthalic anhydride having a temperature of 130°–280°C, whereby there is substantially prevented a buildup in difficult-to-remove, firmly adhering deposits of impurities which otherwise would cause a shut-down in the process.

2. A process according to claim 1, wherein said externally added molten phthalic anhydride has a temperature of 130°–175°C.

3. A process according to claim 1, wherein said flushing is accomplished by spraying said externally added molten phthalic anhydride onto the surface of said heat exchange tubes.

4. A process as defined by claim 1, wherein said heat exchange tubes are flushed at the coldest portions thereof proximate to the gas outlet side of said separator.

5. A process according to claim 1, wherein the end of said melting-off period is the last 0.5 percent of said period.

6. A process according to claim 5, wherein said flushing is conducted once every 20 to 50 cycles of step (b).

7. In a cyclical process of recovering solid phthalic anhydride in a separator from a gas containing phthalic anhydride vapor obtained by catalytic air oxidation of naphthalene in contact with a $V_2O_5$ containing catalyst, comprising continuously repeating in sequence of steps of: (a) passing said gas containing phthalic anhydride vapor over cooled heat exchange tubes to precipitate solid phthalic anhydride on the surfaces thereof; (b) passing a hot fluid having a temperature of about 145°–190°C through said heat exchange tubes to heat the surfaces thereof to at least 130°C and melt off resultant precipitated phthalic anhydride; (c) collecting resultant molten phthalic anhydride from said heat exchange tube surfaces; and (d) cooling said heat exchange tube surfaces by passing a fluid having a temperature of about 45°–55°C therethrough;

the improvement comprising flushing said heat exchange tube surfaces at the heat transfer surfaces thereof proximate to the gas inlet side of said separator towards the end of at least one step (b) with externally added molten phthalic anhydride having a temperature of 130°–280°C, whereby there is substantially prevented a buildup in difficult-to-remove, firmly adhering deposits of impurities which otherwise would cause a shut-down in the process.

8. A process according to claim 7, wherein said externally added molten phthalic anhydride has a temperature of 130°–175°C.

9. A process according to claim 7, wherein said flushing is accomplished by spraying said externally added molten phthalic anhydride onto the surface of said heat exchange tubes.

10. A process as defined by claim 7, wherein said heat transfer surfaces are flushed at the warmest portions thereof proximate to the portion of said separator where the gas first contacts said heat exchange tubes.

11. A process according to claim 7, wherein the end of said melting-off period is the last 0.5 percent of said period.

12. A process according to claim 7, wherein said difficult-to-melt deposits are removed once every 20 to 50 cycles of step (b).

* * * * *